(12) United States Patent
Schmit

(10) Patent No.: US 8,342,792 B2
(45) Date of Patent: Jan. 1, 2013

(54) ARTICLE SEPARATION DIRECTLY ON STORAGE AND RETRIEVAL DEVICE

(76) Inventor: Rob A Schmit, Lake Wylie, SC (US)

( * ) Notice: Subject to any disclaimer, the term of this patent is extended or adjusted under 35 U.S.C. 154(b) by 57 days.

(21) Appl. No.: 12/900,504

(22) Filed: Oct. 8, 2010

(65) Prior Publication Data

US 2011/0097182 A1    Apr. 28, 2011

Related U.S. Application Data

(63) Continuation of application No. PCT/EP2009/002709, filed on Apr. 14, 2009.

(30) Foreign Application Priority Data

Apr. 14, 2008  (DE) .................. 10 2008 019 404

(51) Int. Cl.
    *B65G 1/04*    (2006.01)
(52) U.S. Cl. .................... 414/807; 414/278; 414/282
(58) Field of Classification Search .................. 414/278, 414/280, 282, 286, 807
    See application file for complete search history.

(56) References Cited

U.S. PATENT DOCUMENTS

| | | | | |
|---|---|---|---|---|
| 3,190,473 A | * | 6/1965 | Loef | 414/541 |
| 3,661,280 A | * | 5/1972 | Atwater | 414/282 |
| 3,727,778 A | * | 4/1973 | Hollenbach | 414/541 |
| 4,492,504 A | * | 1/1985 | Hainsworth | 414/273 |
| 4,566,838 A | * | 1/1986 | Binning et al. | 414/278 |
| 4,678,390 A | | 7/1987 | Bonneton et al. | |
| 5,211,523 A | * | 5/1993 | Andrada Galan et al. | 414/282 |
| 7,047,710 B2 | | 5/2006 | Winkler | |
| 8,075,238 B2 | * | 12/2011 | Wirz et al. | 414/281 |
| 2006/0182551 A1 | | 8/2006 | Suess | |

FOREIGN PATENT DOCUMENTS

| | | |
|---|---|---|
| DE | 91 03 198 G | 7/1991 |
| DE | 20 2004 007 004 U1 | 8/2004 |
| DE | 103 13 576 A1 | 10/2004 |
| DE | 20 2005 013 672 U1 | 12/2005 |
| DE | 10 2004 063 588 A1 | 7/2006 |
| DE | 10 2006 037 719 | 2/2008 |
| EP | 0 235 488 A | 9/1987 |
| EP | 1 676 808 A | 7/2006 |

* cited by examiner

*Primary Examiner* — James Keenan
(74) *Attorney, Agent, or Firm* — Timothy M. Barlow

(57) ABSTRACT

Storing and retrieving articles in and from rack warehouses which are filled and emptied, wherein articles are stored on load supports at storage locations of at least one rack of rack warehouse comprises moving a storage and retrieval device, which is movable in a longitudinal direction of the rack and has a lifting table movable in height, to a receiving point of the rack; receiving a load support, which is loaded with an article, from the rack on a load suspension device of the storage and retrieval device; separating article from the received load support on the lifting table by means of a separation station; moving storage and retrieval device to hand-over point, where storage and retrieval device is coupled in a transverse direction of the rack to article conveyor extending in longitudinal direction of rack; and delivering separated article from lifting table to the article conveyor.

9 Claims, 6 Drawing Sheets

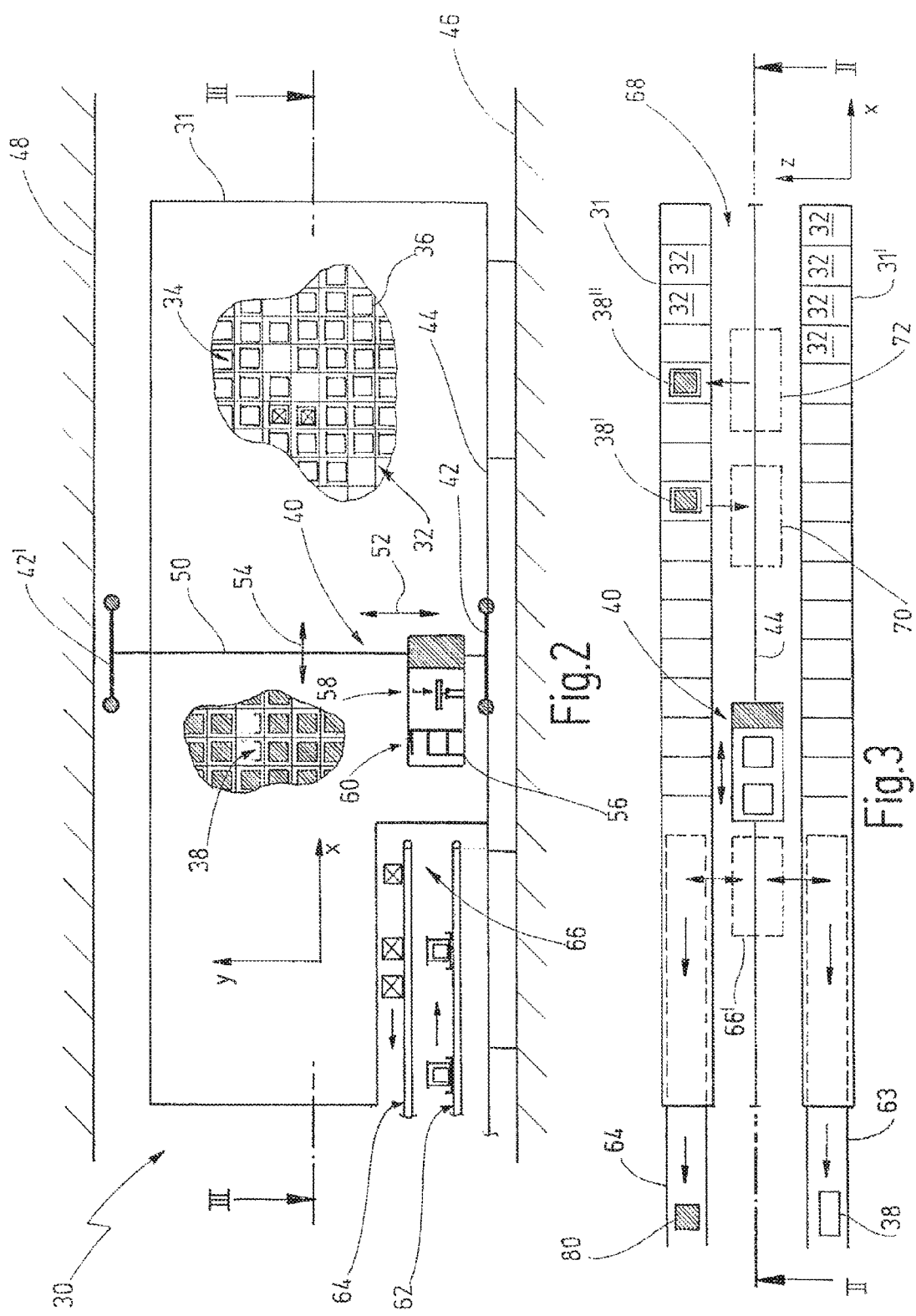

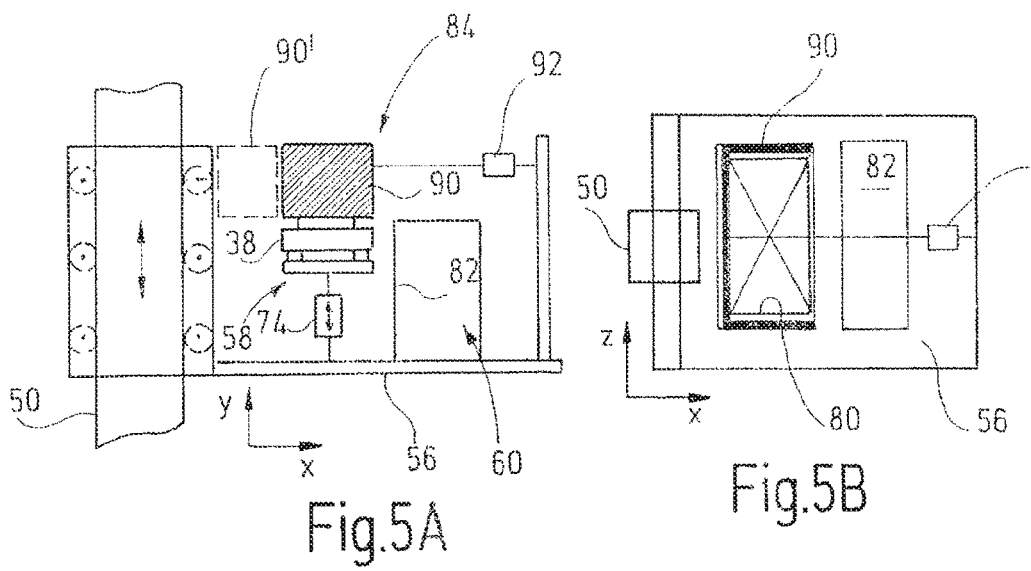
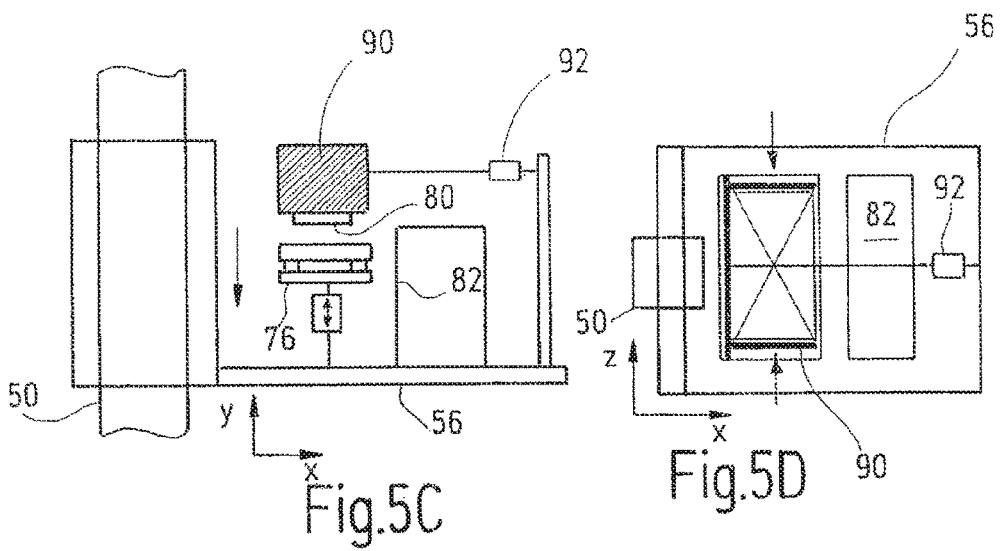
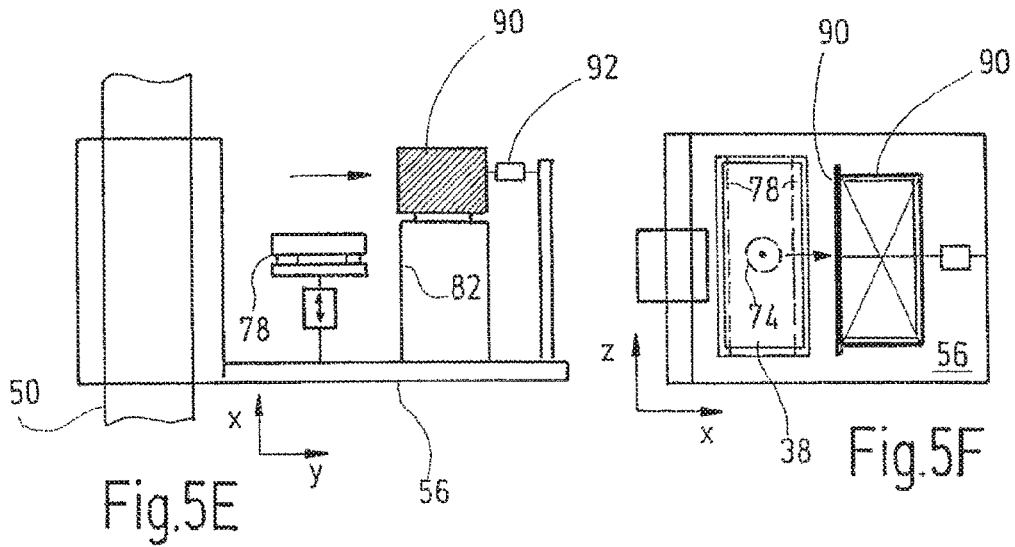

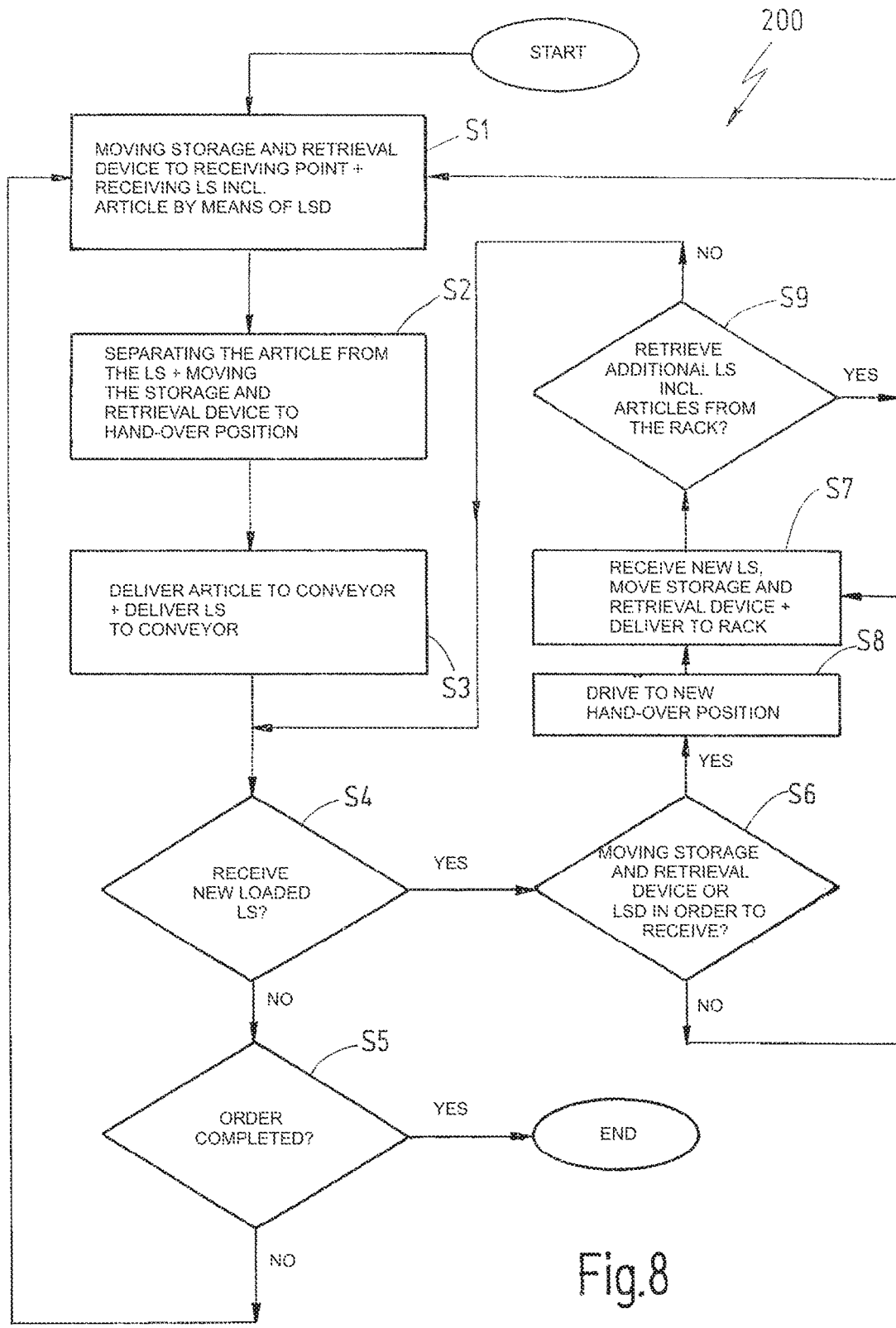

ARTICLE SEPARATION DIRECTLY ON STORAGE AND RETRIEVAL DEVICE

RELATED APPLICATIONS

This is a continuation application of the co-pending international application PCT/EP2009/002709 (WO 2009/127383 A1) filed on 14 Apr. 2009 which claims priority of the German patent application DE 10 2008 019 404 filed on 14 Apr. 2008 which is fully incorporated by reference.

BACKGROUND OF THE INVENTION

The present invention relates to a new and faster method of storing and retrieving articles, which are stored on load supports in a rack warehouse being adapted for usage in an order-picking system, wherein the order-picking system is operated in accordance with the "goods-to-man" principle. The invention further relates to a corresponding storage and retrieval device dedicated to a rack warehouse being adapted for usage in an order-picking system.

RELATED PRIOR ART

Rack warehouses used in modern order-picking systems conventionally comprise a plurality of racks which are arranged side-by-side and on top of each other. Load supports and load carriers such as trays, containers, etc. are stored in the racks. Typically, the load supports are provided with one or more articles of the same article type, i.e. by one sort only, on or in the load supports. The storage and retrieval of the load supports is performed by means of a storage and retrieval device, the loading and working platform (lifting table) of which can reach each single storage location in the rack. Exemplary storage and retrieval devices are described in the documents DE 20 2004 007 004 U1, DE 20 2005 013 672 U1, DE 10 2006 037 719, DE 10 2004 063 588 A1 and DE 91 03 198 G.

A permanent endeavour for an increase in efficiency of such warehouses, particularly automatic small parts warehouses (AKL or "mini load warehouse"), exists in the market. An AKL is an automatic system for storing units, such as cardboard boxes, with little volumes having weights from the low to middle ranges. If cardboard boxes or other articles are stored on trays, one calls this a tray warehouse. Conventionally, operation thereof is performed by means of rail guided storage and retrieval devices (mast or walking beam conveyor) or by vehicles (shuttles) which are supported on cross bars of the racks. Receipt of load supports happens, for example, by reaching below them, by pulling or by picking. There are rack systems having one or more locations for respectively storing one or more units. A storage and retrieval device is a ground conveyor which is typically moved in a rack aisle between two racks, in most cases guided by rails (Verein Deutscher Ingenieure, VDI, 2361). It can be formed by a carriage, one or two masts, a lifting unit and a load suspension device. Pallets, for example, are received with telescope forks, containers are rolled-on, for example, by means of a belt conveyor, pulling devices such as hooks, lassos or pivotal arms or by means of a lifting table or a shuttle.

The document DE 91 03 198 suggests an enhanced storage and retrieval device in order to allow a faster storage or retrieval of load supports in and from the rack, which simplifies storage and retrieval processes as well as drastically reduces storage and retrieval times. The storage and retrieval device of the document DE 91 03 198 is used in a rack aisle of a high-bay-warehouse. It comprises a mast having upper and lower carriages for being guided along rails. A lifting table is movable in a vertical direction along the mast by means of a lifting unit. On the lifting table a so-called transfer unit is provided by means of which containers can be stored and retrieved. The transfer unit comprises a storage section, a central transfer section and a retrieval section. Containers to be stored are received at a front side end of the rack aisle, or containers to be retrieved are delivered there. Containers to be stored are moved to the storage section. Containers to be retrieved are located in the retrieval section. The exchange of the containers between the storage and retrieval device and the rack or the input and output stations arranged at the front side end, happens through the transfer section being arranged centrally on the lifting table. The transfer section can be moved in a telescoping manner perpendicular to the longitudinal direction. Further, the transfer section can be lifted and lowered hydraulically. In its lowered position, it can reach below stored containers. Then, the container is lifted and, in the lifted state, moved backwards to the lifting table. Thus, the transfer unit represents a load suspension device in the classical meaning. An exchange of containers between the centrally arranged load suspension device and the storage section or the retrieval section, which are implemented by means of roller conveyors, happens by means of a handling device being substantially arranged along the longitudinal direction of the lifting table. The handling device comprises follower boards for pushing or pulling containers. The storage and retrieval device of the document DE 91 03 198 is particularly used in an AKL operated with double-deep storage of the containers.

As a matter of principle, after the retrieval of a load support or load carrier being loaded with one or more articles, the articles need to be separated from the load carrier, i.e. the articles are separated for being subsequently packed in or on a shipping carrier (i.e. pallet) in accordance with an order. Typically, the separation is performed either at an order-picking station being located remotely relative to the rack warehouse where humans manually pick articles, for example from storage containers, and put same, for example, into order containers. Alternatively, the separation is performed automatically. The document DE 103 13 576 A1 shows an automated separation of articles stored on trays in the area of a completely automated shipping station. The shipping station is located remotely relative to the rack warehouse as well. The shipping station loads pallets of goods, dedicated to retail, in an autonomous manner. The trays used in the document DE 103 13 576 comprise openings in the bottom, which can be crossed by lifting pins for lifting the loaded article. The articles in the lifted state can then be fed to a stacking robot at a shipping station by means of a pusher.

SUMMARY OF THE INVENTION

It is an object of the present invention to find a more efficient way for separating articles being stored in or on load supports, if the load supports are stored in a rack warehouse, particularly in a high-bay small parts warehouse.

This object is solved by the present invention which discloses a method of storing and retrieving articles in a rack warehouse, wherein the articles are stored on load supports, preferably with one single article on each load support particularly on each tray, in storage locations of at least one rack of the rack warehouse, wherein the method comprises the following steps: moving a rack and retrieval device, which is movable in a longitudinal direction of the rack and has a lifting table movable in height, to a receiving point in the rack;

receiving a load support loaded with an article from the rack on a load suspension device on the lifting table; moving the storage and retrieval device to a hand-over point wherein the storage and retrieval device couples to an article conveyor in the transverse direction of the rack, the article conveyor being orientated along the longitudinal direction of the rack at the hand-over point; and delivering the separated article from the lifting table to the article conveyor.

The inventor has recognized that during picking a lot of time can be saved if separation of the article from the load support already happens during the travel of the storage and retrieval device from the receiving point in the rack to the hand-over point. In this manner, articles can be retrieved directly without load supports from the rack warehouse. The retrieval particularly not only happens without load supports but can already be sequenced, i.e. can happen in the right sequence. Hence, neither a separate separation station needs to be provided in the shipping region, nor a manually operated order-picking station needs to be provided. The present invention also allows an efficient, i.e. particularly fast picking of orders. Thus, automation of the entire order-picking system is possible.

As will be explained in more detail below, a storage and retrieval device which can be used for separating the articles already on the lifting table can be perfectly integrated in the order-picking system of the applicant which is formed in a modular manner.

In accordance with a preferred embodiment the emptied load support, on which the separated article was stored before, is delivered to a load support output conveyor, and subsequently a new load support, which is loaded, is received from a load support input conveyor.

In this manner it is ensured that the rack warehouse is fed steadily with new loaded load supports so that a predefined filling degree of the warehouse is kept constant. Emptied load supports, i.e. load supports without articles after the separation process, are delivered to a conveyor for providing space on the storage and retrieval device in view of a new separation process. The input section, dedicated to loaded load supports, and the output section, dedicated to emptied load supports, can be identical, particular if the storage and retrieval device has a number of load suspension devices.

Further, it is advantageous if the delivery of the emptied load support happens during the delivery of the separated article to the article conveyor.

In this manner time can be saved which is required for an exchange cycle, since the delivery of the article and the emptied load support happens simultaneously.

In particular, the receipt of the new loaded load support happens during the delivery of the article from the storage and retrieval device to the article conveyor.

In this case, the delivery of the article can happen in a parallel manner with regard to the receipt of a new loaded load support. This is particularly advantageous if the delivery further happens simultaneously with the delivery of the emptied load support. For example, this can be technically realized by arranging the load support input and the load support output on opposing ends of a rack aisle, wherein the emptied load support can be conveyed away by means of the driven conveying device of the load suspension device, while the new loaded load support can be moved from the load support input section to the load suspension device of the storage and retrieval device by means of a pusher. If a pusher is used at the load support input, the conveyor of the load suspension device does not necessarily need to be operated for delivering the emptied load support, since the pusher pushes the loaded load support to the load suspension and thereby, simultaneously, pushes the empty load support from the load suspension on the load support output.

In accordance with another preferred embodiment the separation process happens during travel of the storage and retrieval device or the lifting table towards the hand-over point.

Hence, the present invention is more than just shifting a remotely located separation station into the storage and retrieval device. The inventor has recognized that a significant time saving is possible besides the savings associated with of a work station in the material flow, since the separation process happens during (travel) time which is required in any case for moving the storage and retrieval device from the receiving point to the hand-over point.

Further, it is advantageous if the step of receiving the loaded load support at the receiving point comprises: extending the load suspension device or a gripping device, assigned to the load suspension device, in a transverse direction for reaching below or gripping loaded load supports being stored in the rack; and retracting the load suspension device or the gripping device.

If the load suspension device reaches below the load support in the rack, the load suspension device is further to be provided with a device which allows displacement of the load suspension device in a transverse direction relative to the rack aisle. Otherwise, the load suspension device is to be provided with a gripping device which can be actuated in the transverse direction.

In accordance with another advantageous embodiment the separation process comprises the following steps: moving a transfer device of the separation station to a take-over position; moving the load suspension device to a delivery position; and moving the transfer unit from its take-over position to hand-over position, which is laterally distanced in a longitudinal direction relative to the delivery position of the load suspension device and from which the separated article is delivered to the article conveyor by means of the transfer device.

The storage and retrieval device is provided with a corresponding controlling device adapted for coordinating the movements which are required for conducting the separation process. Dependent on the design of the load suspension device and/or the separation station, different movement sequences for separating the article from the load support are required. In terms of controlling, a take-over position and a delivery position for the transfer device as well as a delivery position for the load suspension device are defined. The controlling software can be adapted to the respectively used type of load suspension device and to the transfer device by a corresponding programming. The customer is free in selecting the type of load support to be used. The movement sequences required for separating containers, for example, are different than the ones for trays. Another difference can be seen in that the load support can be provided with or without a rim.

In accordance with another embodiment the load support is a container having a rim, or a tray having a rim, and the transfer device takes the article, which is to be separated from the load support, when the load suspension device is in its delivery position, wherein the load suspension device is subsequently lowered before the transfer device is moved in its hand-over position.

If the load suspension device has a rim, it is required that the article is moved over the rim during the separation process. The load suspension device is lowered for this purpose, if the article definitely has been gripped by the transfer device.

In accordance with another embodiment, if the load support is a container having a rim, or a tray having a rim, the transfer device takes the article, which is to be separated from the load support, at the take-over position such that, if lifting pins of the load suspension device have lifted the article directly through at least one assigned opening in the bottom or via a movable bottom plate arranged inside the container to a delivery height, the article can be moved to the hand-over position.

This embodiment, having lifting pins or lifting elements, represents an alternative to the above explained gripping mechanism. The articles are lifted over the rim by means of the lifting pins. The lifting of the article is either performed directly, i.e. by means of direct contact of the lifting pins with the article, or indirectly by storing the articles on plates which serve as bottoms of the load supports. This bottom plates preferably lie on an edge of the actual load support, which in turn comprises a big or several smaller openings through which the lifting pins can reach.

In accordance with a still other embodiment, if the load support is a tray without a rim, the transfer device pulls the articles, which are to be separated, from its take-over position into the delivery position.

In this case, relative movement of the article in a vertical direction is not required since no rim needs to be cleared. Therefore, the article can just be pulled down from the tray.

Additionally, it is advantageous if a loaded load support is delivered by the load suspension device of the storage and retrieval device to the rack, i.e. to a storage location, at a delivery point.

Then, the rack is also filled so that a predefined filling grade can be kept permanently.

The above-mentioned object is additionally solved by a storage and retrieval device for usage in an order-picking system having a rack warehouse, particularly a high bay rack-small parts warehouse, wherein the storage and retrieval device is movable in a longitudinal direction in a rack aisle along a rack, which comprises a plurality of at least single-deep storage locations being arranged side-by-side in rack planes which are arranged on top of each other, and the rack being supplied with load supports, particularly trays, by means of the storage and retrieval device, wherein each of trays is preferably loaded with one single article, and wherein the storage and retrieval device comprises a height-adjustable lifting table which in turn is provided with a load suspension device for exchanging load supports in a transverse direction between the rack and the storage and retrieval device, and which is provided with a separation station for separating an article from a loaded load support on the lifting table, wherein the rack aisle is at least coupled to a load support conveyor and an article conveyor.

Additionally, it is advantageous if such a storage and retrieval device is used in a rack warehouse.

In accordance with another preferred embodiment again a correspondingly equipped rack warehouse is used in an order-picking system. The order-picking system also comprises such a rack warehouse, wherein the rack warehouse in turn comprises the storage and retrieval device in accordance with the invention.

BRIEF DESCRIPTION OF THE DRAWINGS

It is clear that the above-mentioned and still to be explained features are not only applicable in the respectively given combination but also in other combinations or alone, without departing from the scope of the present invention.

Embodiments of the invention are illustrated in the drawings and will be explained in more detail in the following description, wherein:

FIG. 2 shows a side view of a storage and retrieval device (SRD) and a rack warehouse in accordance with the present invention;

FIG. 3 shows a top view of the warehouse of FIG. 2;

FIG. 5a-f show snap shots of a schematically illustrated separation process, wherein an article is separated from a tray on the lifting table of another embodiment of a storage and retrieval device in accordance with the present invention, while the storage and retrieval device is moved;

FIG. 8 shows a flow chart of a method in accordance with the present invention for retrieving articles, separated from load supports, from a rack warehouse.

PREFERRED EMBODIMENTS OF THE INVENTION

Figure 1:
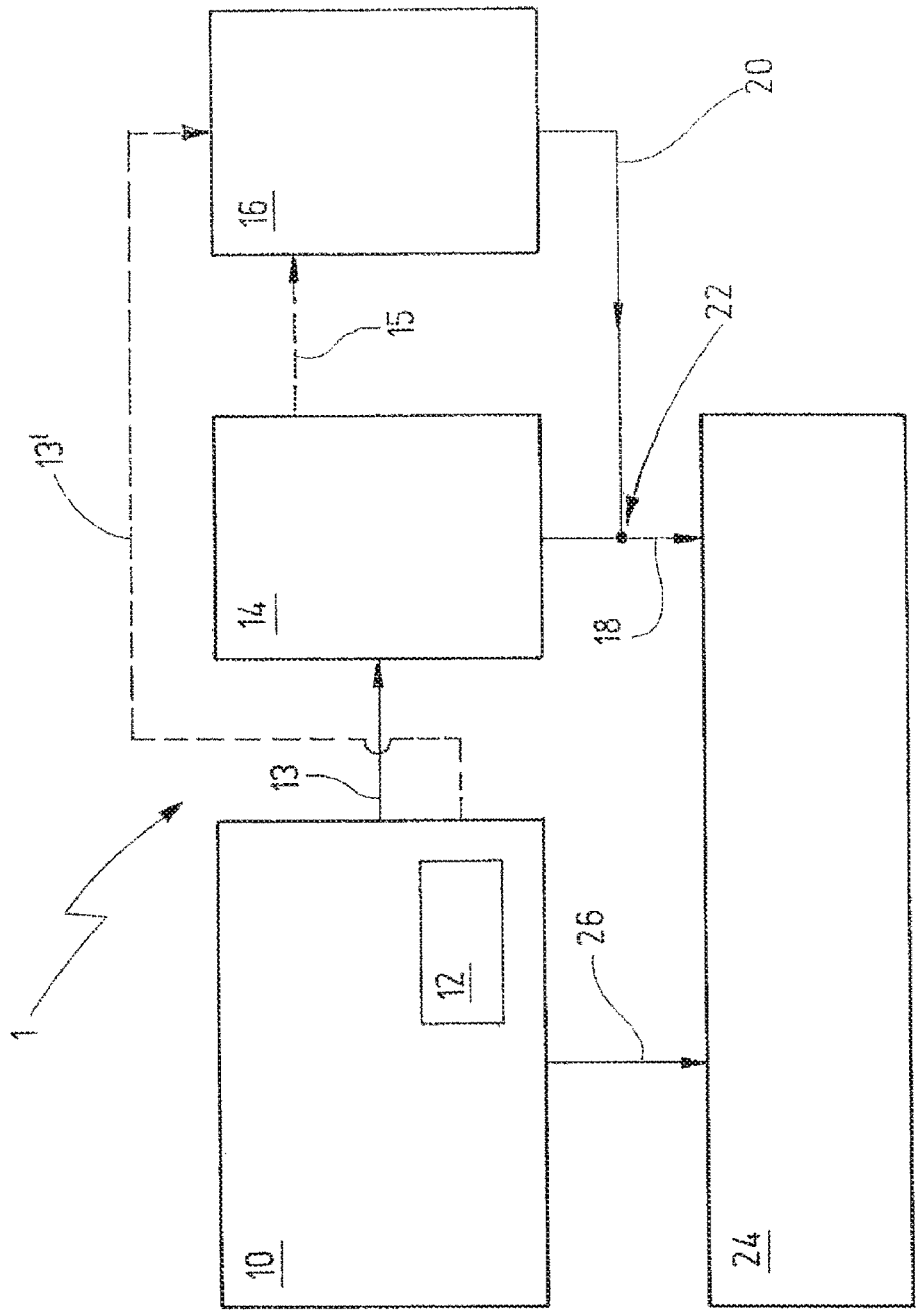
FIG. 1 shows a block diagram of a conventional order-picking system.

In the following description of preferred embodiments of the present invention similar elements are designated with similar reference numerals. Identical elements are provided with identical reference numerals. Modifications will be described explicitly.

The present invention is particularly based on a picking concept as described in the German patent application DE 10 2006 025 618 A1 which is fully incorporated by reference. This picking concept provides that pallets, which are stored in a high bay warehouse, are depalletized in layers onto trays, and subsequently moved to a tray warehouse which is specifically adapted to such trays. In such a tray warehouse, preferably, so-called "fast movers" or "fast-moving items" are stored which in turn correspond to so-called "A articles" in accordance with the ABC method (Lorenz curve, ABC distribution). So-called "slow movers" (articles of the category B or C) or remaining stock of pallet layers are moved to a so-called single tray warehouse. Slow movers are articles which have a low handling frequency. The basic concept is explicitly described in the document DE 10 2006 025 618 A1 which is fully incorporated by reference. The arrangement of the employed tray warehouse is also described in the German patent application DE 10 2006 025 620 A1 which is also fully incorporated by reference.

FIG. 1 schematically shows the structure of a corresponding order-picking system 1. The system 1 can comprise a high bay warehouse 10 adapted for receiving pallets, a depalletizing unit 12, a tray warehouse 14 for receiving layerwise loaded trays, a single tray warehouse 16 for receiving trays holding one single article, as well as a shipping area 24. The just mentioned elements are illustrated by blocks in FIG. 1. The blocks in turn are connected by means of arrows representing the material flow or conveyors. The high bay warehouse 10 is connected to the tray warehouse 14 via a first conveyor 13 for transporting trays holding one single pallet layer of articles, which have been depalletized in a layerwise manner by the depalletizing unit 12. Another conveyor 13', adapted for trays holding one single article, connects the high bay warehouse 10 and the depalletizing unit 12 to the single tray warehouse 16. If there is a remaining stock during the unloading of trays in the warehouse 14, it will be separated in the warehouse 14 and shifted to single trays, and delivered to the tray warehouse 16 via another conveyor 15.

Separation of articles in accordance with picking orders takes place in the warehouse 14 which is connected to the shipping area 24 by means of a central conveyor 18. The retrieval of articles from the warehouse 14 takes place in a sequenced manner via the central conveyor, preferably using a so-called window concept, as described in the German patent application DE 10 2001 016 453 which is fully incorporated by reference. In accordance with the present invention articles, which have already been separated from the trays in the single tray warehouse 16, can, for example, be fed to the central belt conveyor 18 via a conveyor 20 at a feeding point 22.

A storage and retrieval device in accordance with the present invention will be described hereinafter, as well as a rack warehouse in which the storage and retrieval device is used. This warehouse can be the single tray warehouse 16 of FIG. 1. The present invention can be used in exactly the same way in an isolatedly provided rack warehouse such as an AKL or any other order-picking system having racks.

FIG. 2 shows a side view of a rack warehouse 30, which can be generally used in order-picking systems which in turn are operated in accordance with the "goods-toman" principle. Further, in FIG. 2 a storage and retrieval device 40 in accordance with the present invention is depicted, which is used in the rack warehouse 30.

The rack warehouse 30 comprises one or more racks 31 which can be provided as single racks or double racks, wherein double racks typically are positioned back-to-back. In FIG. 2, one faces a longitudinal side of the rack 31. A longitudinal direction is designated by X. A vertical direction (height) is designated by Y. The rack 31 comprises a plurality of storage locations 32 which are arranged in rack planes being arranged on top of each other. Each rack plane comprises a number of storage locations 32 arranged side-by-side, as exemplarily shown in two regions of FIG. 2 being depicted in more detail. In the right region not all of the storage locations 32 are loaded with a load support (LS) 34. In the right region of detail, containers 36 having a surrounding collar-like rim are used. The containers are supported by, for example, L-shaped rails on rack posts in the rack 31 by means of the rim. In the left region of detail, trays 38 having rims are used as load supports for storing articles.

The storage and retrieval device 40 comprises at least a first carriage 42 and optionally a second carriage 42'. The storage and retrieval device 40 travels along a rail 44 in the longitudinal direction X of the rack by means of the lower carriage 42. For example, the rail 44 is anchored in the ground 46, but can also be secured to the rack. The same applies for the upper carriage 42', if present, wherein a corresponding running rail is anchored, for example, in a ceiling 48 of a hall.

The storage and retrieval device 40 further comprises a mast 50 along which a handling unit of the storage and retrieval device 40 can travel in a vertical direction (Y-direction) by means of a lifting unit, as indicated by a double arrow 52. The storage and retrieval device 40 can travel by means of the carriages 42 or 42' in the longitudinal direction X of the rack, as indicated by a double arrow 54. In this manner, the storage and retrieval device 40 can reach each arbitrary storage location 32 of the rack 31 for either retrieving a loaded load support 34 or storing a new load support 34 to the rack 31 for the purpose of refilling.

The handling unit of the storage and retrieval device 40 comprises a platform which is fixedly connected to the lifting unit, the platform being designated as lifting table 56. The load suspension device (LSD) 58 as well as the separation station 60 are arranged on the lifting table 56. Load supports 34 are exchanged by means of the load suspension device 58 between the storage and retrieval device 40 and the rack(s) 31, 31' in a transverse direction (Z direction) which is orientated perpendicular to the drawing plane of FIG. 2. The separation station 60 serves for separating articles from their load supports 34, wherein the separation process particularly happens during the time when the storage and retrieval device 40 travels to a so-called hand-over point 66. At the hand-over point 66 the exchange of already separated articles between the storage and retrieval device 40 and an article conveyor 64 takes place. The exchange of empty and/or loaded load supports 34 happens in the transverse direction between the storage and retrieval device 40 and a load support conveyor 62.

The conveyors 62 and 64 are arranged on top of each other with the embodiment in accordance with FIG. 2, and additionally reach into the rack 31. The conveyors 62, 64 are arranged so that articles and load supports can be exchanged between the storage and retrieval device 40 and the conveyors 62 and 64. The exchange can occur at any arbitrary position, where the rack aisle and the conveyors overlap. In the example of FIG. 2, the hand-over point 66 is arranged at a right end of the conveyors 62 and 64. It is clear that the hand-over location 66 can be selected arbitrarily. Further, it is clear that arbitrarily many conveyors can be arranged on top of each other. Particularly, a load support conveyor (load support input conveyor) as well as another conveyor for emptied load supports (load support output conveyor), being arranged separately thereto, can be provided, which are either arranged on top of each other or side-by-side—relative to the rack aisle—, as exemplarily shown in the top view of FIG. 3. Additionally, the conveyors can also be connected to the rack 31 at front ends thereof so that the conveyors do not reach into the rack 31. In this case, the running rail 44 needs to be adapted such that there are overlapping regions relative to the conveyors arranged at a front end, in order to ensure an exchange with the storage and retrieval device.

The load support conveyor 62 is only needed if the trays are loaded with articles outside the warehouse 30. If the load supports are loaded inside the warehouse 30 or on the storage and retrieval device 40, the conveyor 64 is sufficient for transporting articles in and out. In this case, the conveyor 62 is not required. Then, the trays remain in the warehouse 30 or in the racks 31 and 31'. The articles can be loaded on the storage and retrieval device 40 by means of a "separation station" thereof by reversing the process, just like the separation of the articles from the load support typically happens on the tray. In this case, the "separation station" is also a loading station. In this manner, one conveyor can be saved, resulting in lower investment and maintenance costs.

FIG. 3 shows a top view of the rack warehouse 30 of FIG. 2. The hand-over point 66 of FIG. 2 is depicted as a block (dotted line) 66' in the rack aisle 68. The rack aisle 68 is adjacent to the rack 31 depicted in FIG. 2 and another rack 31' is arranged opposingly. The storage and retrieval device 40 can travel along the longitudinal direction X of the rack 68, as indicated by a double arrow. An exchange of articles and loading or emptying load supports between the storage and retrieval device 40 and the conveyors 62-64 happens in the transverse direction, as indicated by double arrows in the Z direction.

The load support output conveyor 63 is arranged within the range of the rack 31'. Here, the conveyor 63 exemplarily serves only for transporting away empty load supports, particularly empty trays 38. Hence, in this case the load support input and load support output are facing the rack aisle 68. It is clear that the input and the output can also be arranged on top of each other in the area of each of the racks 31 or 31'.

Further, a tray 38', loaded with one article, on the storage location 32 is indicated in FIG. 3. If the tray 38' is to be retrieved by the storage and retrieval device 40, the storage and retrieval device 40 moves to a corresponding receiving point 70 which is depicted as a block in a broken line. If a loaded tray has been received by the load support input 62 and is to be delivered to the rack 31, as exemplarily indicated for the tray 38", the storage and retrieval device 40 moves to a delivery point 72 which is also indicated by a block and broken lines in the rack aisle 68.

Figure 4:
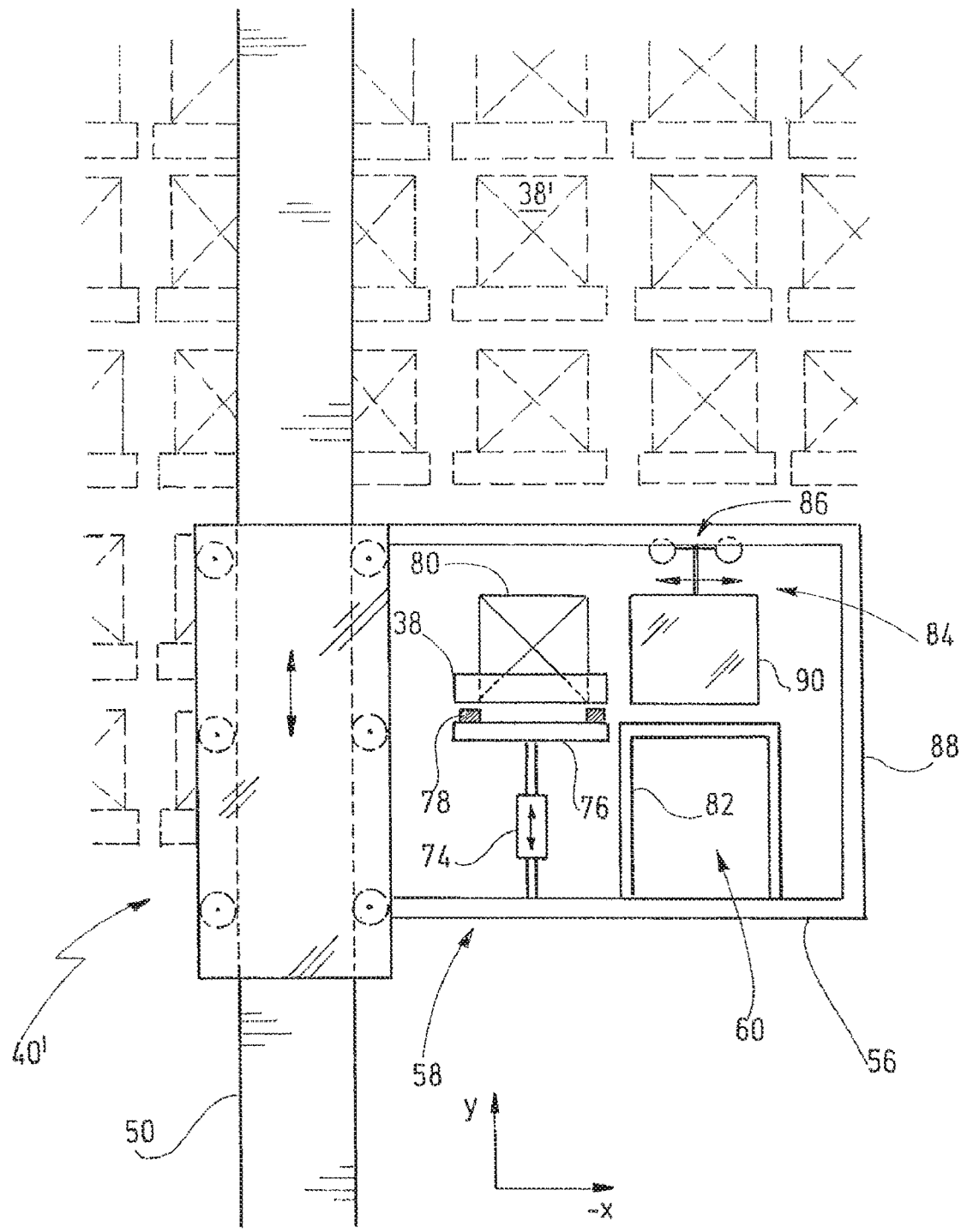
FIG. 4 shows an enlarged side view of an embodiment of the storage and retrieval device in accordance with the present invention.

With reference to FIG. 4 an exemplary side view of another embodiment 40' of a storage and retrieval device in accordance with the present invention is shown.

The storage and retrieval device 40' also comprises a lifting table 56. A load suspension device 58 as well as a separation station 60 are arranged on the lifting table 56.

The load suspension device 58 comprises a lifting cylinder 74 for lifting and lowering a platform 76. For example, left and right driven belt conveyors 78 are provided on the platform 76 so that the tray 38 can be conveyed independently in a trans-verse direction (Z direction). Further, the platform 76 or the belt conveyors 78 are extendable in the transverse direction for taking a loaded tray 38' from the rack by reaching below the same. The article on the tray 38 is designated by 80 hereinafter.

The separation station 60 comprises a parking frame 82. Further, the separation station 60 comprises a transfer device 78 which can travel in the longitudinal direction by means of a carriage 68 along a guiding frame 88, which is connected to the lifting table 56. In this case, the transfer device 84 exemplarily comprises a gripping device 90. Also, the transfer device 84 can be realized as a pusher or a pulling member.

With reference to FIGS. 5A-5F a separation process is shown in the context of another embodiment of a storage and retrieval device in accordance with the present invention. The storage and retrieval device of FIGS. 5A-5F differs from the storage and retrieval device of FIG. 4 only in the guidance of the transfer device 84. The transfer device 84 of FIGS. 5A-5F is moved in the longitudinal direction X by means of a cylinder 92.

FIG. 5A shows a side view and FIG. 5B shows a top view of the transfer device 84 of FIG. 5A when the transfer device is in its take-over position. The load suspension device 58 is in its delivery position in the FIGS. 5A and 5B. The tray 38 holding the article 80 was previously retrieved from the rack, in order to obtain the position shown in the FIGS. 5A and 5B. The load suspension device 74 can be lowered, allowing the gripping device 90 to be driven to the position as shown in the FIGS. 5A and 5B. Alternatively, the load suspension device 58 can remain in the lifted position, wherein the gripping device 90 was previously driven to the position 90' in order not to collide with the gripping device 90 when retracting the load suspension device 58.

As shown in FIGS. 5C and 5D the gripping device 90 can be opened and closed in the transverse direction (Z direction). Lateral elements of the gripping device 90 surround the article 80, as indicated by dark arrows in FIG. 5D. The load suspension device is lowered, as indicated in FIG. 5C by another arrow. The gripping device 90 holds the article 80 alone. FIG. 5D shows the top view of FIG. 5C.

With reference to FIGS. 5E and 5F a transfer device 84 in its hand-over position is shown. FIG. 5F shows the top view of FIG. 5E. The article 80 is moved on the parking frame 82 for this purpose. The article 80 located on the frame 82 can be delivered later to the article conveyor 64 by means of pulling and/pushing devices, which are not illustrated here. The lifting table 56 is moved to a corresponding height for this purpose. Simultaneously, the empty load support 38 can be delivered to the load support output conveyor 63 (cf. FIG. 3). If the load suspension device 68 is not in the right height for this purpose, then the platform 76 can be moved to a suitable hand over height by means of the cylinder 74. Then, the empty tray 38 can be transferred by means of the driven belt conveyor 78 in the transverse direction Z to one of the load support conveyors 62 and 63.

Figure 6:
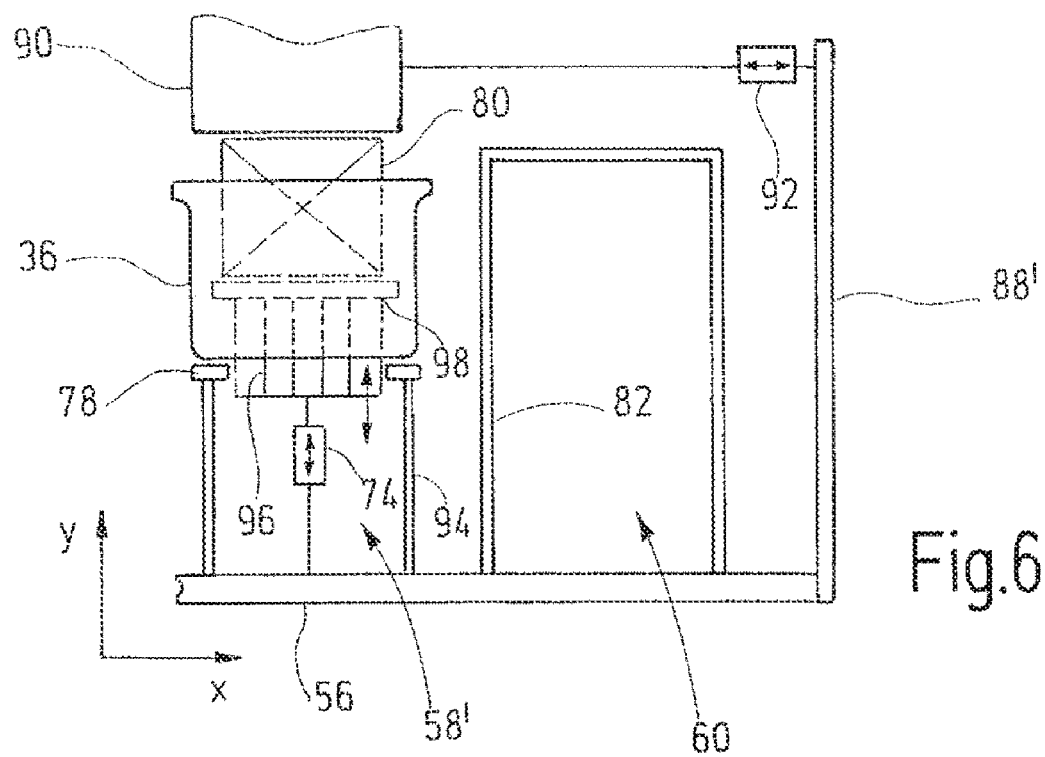
FIG. 6 shows a partial side view of another embodiment of a storage and retrieval device in accordance with the present invention handling containers.

Another embodiment of a storage and retrieval device in accordance with the present invention is shown in FIG. 6. The separation station 60 including its transfer device 84 has not been changed with respect to the embodiment of FIG. 5. Only the load suspension device 58' has been adapted for allowing to handle containers 36.

In this case, the load suspension device 58' also exemplarily comprises belt conveyors 78 which are fixed to the frame 94. The lifting cylinder 74 is arranged between the frame 94. The lifting cylinder 74 is connected to the platform, which in turn comprises a plurality of lifting pins 96. The lifting pins 96 are arranged such that they can reach through openings in the bottom of the containers 36 for either lifting directly the article 80 or lifting the article 80 via a plate 98 which is arranged in the bottom region of the container 36. The article 80 can be lifted by means of the lifting pins 96, which are actuated via the cylinder 74, such that the gripping device 90 can take the article 80 for subsequently transferring the same on the parking frame 82.

Figure 7:
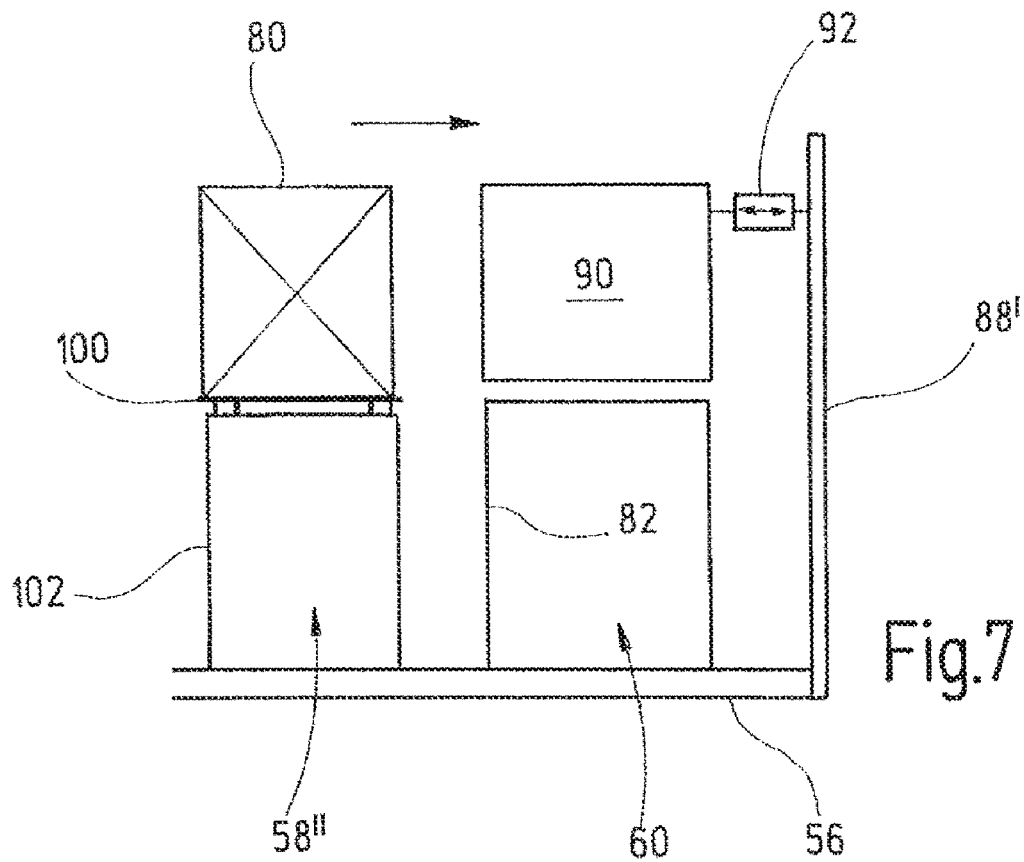
FIG. 7 shows a partial side view of another embodiment of a storage and retrieval device in accordance with the present invention handling trays without rims.

FIG. 7 shows another embodiment of a storage and retrieval device in accordance with the present invention, wherein the load suspension device in turn has been changed. The load suspension device 58" of FIG. 7 differs from the load suspension device 58 of FIG. 5 and the load suspension device 58' of FIG. 6 in that the lifting cylinder 74 is omitted. The lifting cylinder 74 can be omitted, if trays 100 without rims are used as load supports. Then, it is sufficient to provide a frame 102 adapted to a conveyor which is extendable in the transverse direction. Then the article 80 is merely pulled on the frame 85 by the transfer device 74, as depicted in FIG. 7 by means of an arrow. Here, the article is not required to be closely gripped.

It is clear that the load suspension devices 58, 58' and 58" are respectively arranged with a suitable distance relative to the separation station 60 for safely ensuring the transfer.

Further, it is clear that a number of load suspension devices can be arranged on the lifting table in a side-by-side manner for allowing to handle a number of load supports 34 simultaneously. Alternatively, a number of units can be arranged on top of each other, respectively being formed of one or more load suspension devices and one or more separation stations.

In FIG. 8 a method 100 for storing and retrieving load supports in accordance with the present invention is shown.

In a first step, the storage and retrieval device 40 is moved to a receiving point 70, where a load support 34 such as a tray 38' (cf. FIG. 3) holding one article 80 can be received. The receipt happens by means of the load suspension device 58 (step S1). Subsequently, the article 80 is separated from the load support 34 in a step S2. This particularly happens while the storage and retrieval device 40 is moved from the receiving point 70 to the hand-over point 66 (or 66').

At the hand-over point 66 or 66', the article 80 being separated from the load support 34 is delivered to the article conveyor 64 in the transverse direction (cf. step S3). Optionally, the emptied load support 34 can be delivered to a load support conveyor 62 and/or 63.

In a step S4, it can be checked whether a new, i.e. loaded, load support 38 is to be transported to the rack 31. If a superordinated material flow computer determines that any new load support 34 is to be stored, it can be checked in step S5 whether all (travel) commands of the storage and retrieval device 40 are processed. If further articles 80 need to be retrieved from the rack warehouse 30, the storage and retrieval device returns to the new receiving point 70 and the method is repeated, beginning at the step S1. If it is determined that no further article 80 is to be retrieved from the rack 31 or 31', the method ends.

If the inquiry of step S4 results in that loaded load supports 34 are to be stored into the rack 31 or 31", step S6 checks whether the storage and retrieval device 40 and/or the load suspension device 58 need to be moved by one of the load support conveyors 60 or 63 for the purpose of receiving the loaded load support 34. It is clear that the movement of the storage and retrieval device 40 as well as the load suspension device 58 and the separation station 60 is coordinated by a controlling device associated with the storage and retrieval device. Such a controlling device can be implemented, for example, as a stored-programme controller (SPC) which is connected, for example, via a bus to the material flow computer and/or a superordinated warehouse management computer.

If the storage and retrieval device 40 or the load suspension device 58 does not need to be moved in accordance with the enquiry of the step S6, in a step S7 a new load support is received, the storage and retrieval device 40 travels to the delivery point 72 and the load support 34 is delivered to one of the racks 31 and 31'. Otherwise, the storage and retrieval device 40 or the load suspension device 58 is moved in a position for receiving new load supports (step S8) for subsequently continuing with the step S7.

If the new load support 34 has been delivered to the rack 31 or 31' it can be requested in step S9 whether additional load supports, including articles, need to be retrieved from the rack 31 or 31'. If new load supports need to be retrieved from the rack, the method returns to the step S1. If no new load supports need to be retrieved from the rack, the method returns to the inquiry of the step S4.

It is clear that the load supports can be loaded with one or more articles. Preferably, each load support is, however, loaded with one single article 80 only. Particularly, trays with or without rims are used as load supports. A tray without rim is a load support which can be handled in a very simple manner. The higher the rim is, the more difficult the handling of the load support becomes. In this view, a container represents a tray having a very high rim.

It is clear that the separation station 60 can be operated with different transfer devices 84. Only one gripping device 90 has been shown here in an exemplary manner. Alternatively, other transfer devices can be used nevertheless such a vacuum suction apparatuses, pushers, pullers, etc.

The same applies for the load suspension device 58. Here, particularly the use of belt conveyors 78 was mentioned. Alternatively, extendable and retractable forks or the like can be used. It is not required that the platform 76 of the load suspension device 58 can be extended in the transverse direction. The load suspension device 58 alternatively can be provided with an additional gripping device, being similar to the gripping device 90, but which is substantially actuated in the transverse direction.

I claim:

1. A method for storing and retrieving articles in and from a rack warehouse which is to be filled and emptied, wherein the articles are stored on load supports at storage locations of at least one rack of the rack warehouse, comprising:
    moving a storage and retrieval device, which is movable in a longitudinal direction of the rack and has a lifting table movable in height, to a receiving point of the rack;
    receiving a load support, which is loaded with an article, from the rack on a load suspension device of the storage and retrieval device;
    separating the article from the received load support on the lifting table by means of a separation station;
    moving the storage and retrieval device to a hand-over point, where the storage and retrieval device is coupled in a transverse direction of the rack to an article conveyor extending in the longitudinal direction of the rack; and
    delivering the separated article from the lifting table to the article conveyor,
    wherein the step of separating includes:
    moving a transfer device of the separation station to a take-over position; moving the load suspension device to a delivery position; and
    moving the transfer device from its take-over position to a delivery position, which is laterally distanced in the longitudinal direction relative to the delivery position of the load suspension device and from where the separated article is delivered to the article conveyor by means of the transfer device, wherein the load support is a container having a rim, or is a tray having a rim, and the transfer device grips the article which is to be separated from the load support, when the load suspension device is in its delivery position, wherein the load suspension device is subsequently lowered before the transfer device is moved to its delivery position.

2. The method of claim 1, wherein each load support respectively carries one single article.

3. The method of claim 2, wherein the load support is a tray.

4. The method of claim 1, wherein an empty load support, on which the separated article was stored before, is delivered to a load support output conveyor, and a new loaded load support is subsequently received from a load support input conveyor.

5. The method of claim 4, wherein the delivery of the empty load support takes place during the delivery of the separated article to the article conveyor.

6. The method of claim 4, wherein receipt of the new loaded load support takes place during the delivery of the article from the storage and retrieval device to the article conveyor.

7. The method of claim 1, wherein the separation process takes place during movement of the storage and retrieval device or of the lifting table towards the hand-over point.

8. The method of claim 1, wherein the step of receiving the loaded load support at the receiving point comprises:
    extending the load suspension device or a gripping unit, associated with the load suspension device, in a transverse direction for taking or reaching below the loaded load support being stored in the rack; and
    retracting the load suspension device or the gripping unit towards the lifting table.

9. The method of claim 1, wherein a loaded load support is delivered from the load suspension device of the storage and retrieval device to a storage location in the rack at a delivery point.

* * * * *